July 30, 1929.  R. HAMILTON  1,722,665
TRANSMISSION ASSEMBLY
Filed July 21, 1926  2 Sheets-Sheet 1
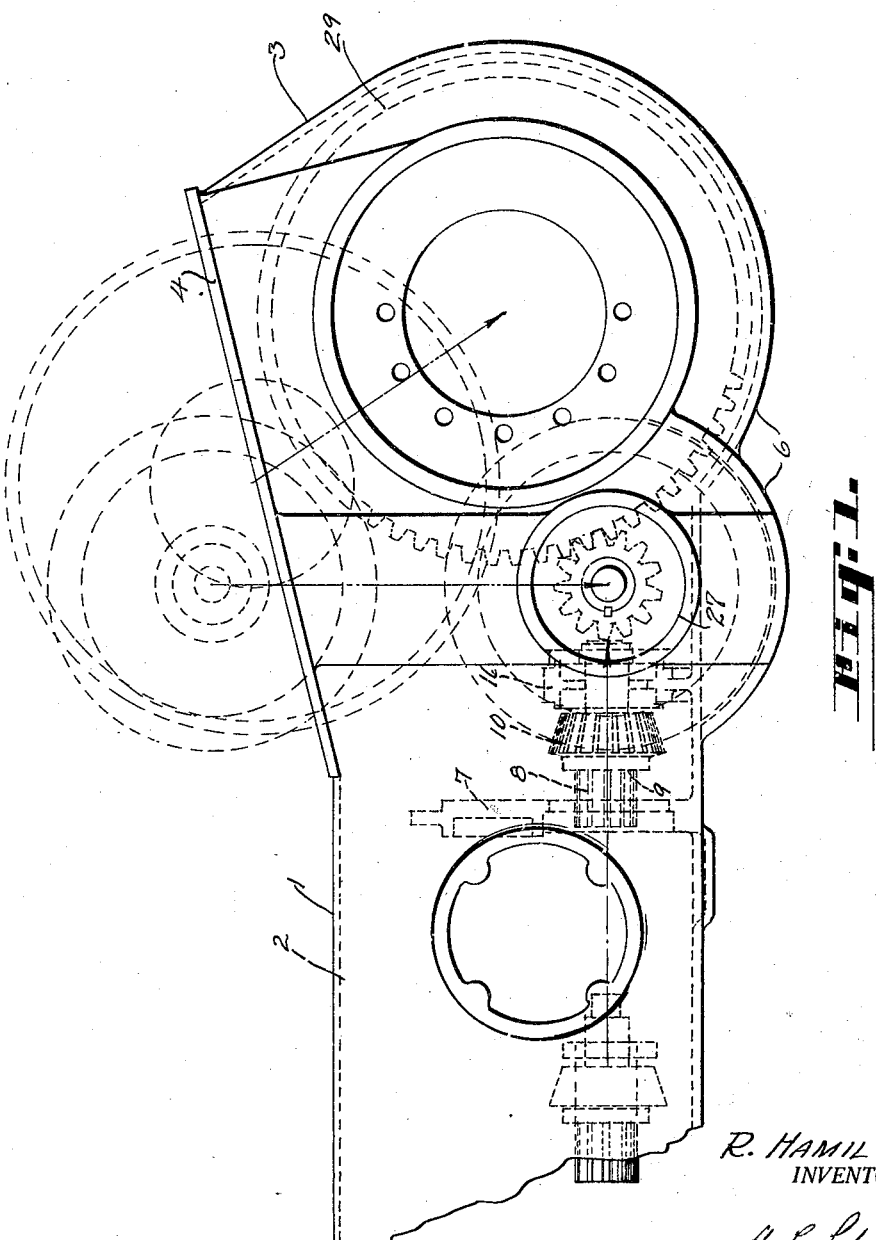
R. HAMILTON.
INVENTOR
BY H. C. Schroeder
ATTORNEY

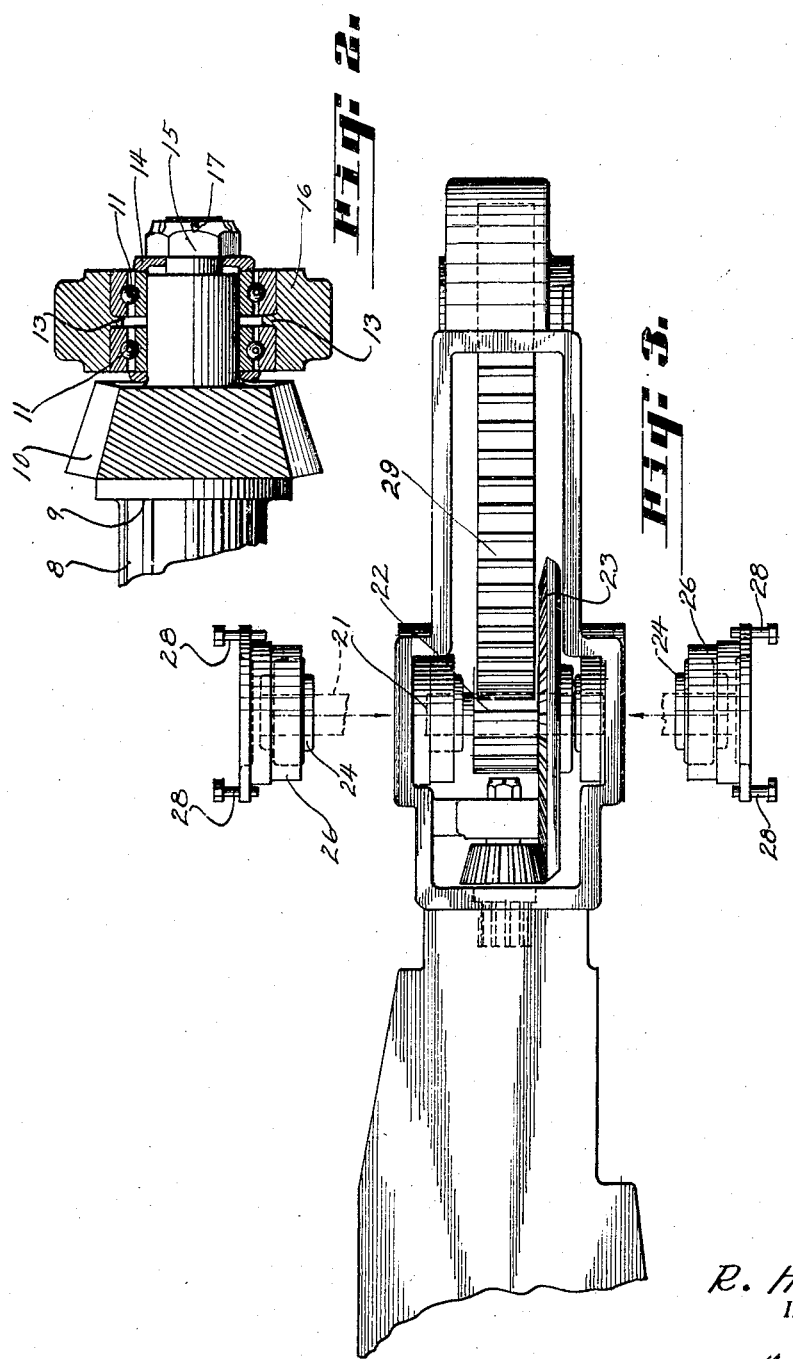

Patented July 30, 1929.

1,722,665

UNITED STATES PATENT OFFICE.

RUSH HAMILTON, OF PIEDMONT, CALIFORNIA, ASSIGNOR TO STANDARD GAS ENGINE CO., OF OAKLAND, CALIFORNIA.

TRANSMISSION ASSEMBLY.

Application filed July 21, 1926. Serial No. 123,917.

The present invention relates to improvements in a transmission for motor vehicles, and its particular object is to provide an improved differential assembly for the Fordson tractor. The principal features of the present invention have been described in the co-pending application, Serial No. 53,308, in which application the assembly, as such, was claimed. In the Fordson tractor, power is transmitted to the large differential gear by means of a worm, and I have found that certain advantages may be derived from the substitution of the spur gears for the worm, the principal advantages being that transmission thru spur gear as proposed by me allows of further speed reduction, prevents overheating, and allows the entire transmission to be lifted relative to the rear axle so as to be further away from the ground surface whereby additional clearance is secured.

Further objects and advantages of my invention will appear as the specification proceeds.

The preferred form of my invention is illustrated in the accompanying drawings, in which Figure 1 shows a side elevation of my transmission assembly, Figure 2 a detail view illustrating a spur gear assembly on an enlarged scale, and Figure 3 a plan view of the transmission assembly.

While I have shown only the preferred form of my invention, it should be understood that various changes or modifications may be made within the scope of the claims hereto attached without departing from the spirit of the invention.

Referring to the drawings in detail, it will be noted that the housing 1 for my transmission is elongated and may be divided into a front section 2 having substantially flat and parallel top and bottom faces and a somewhat enlarged rear section 3, having a top face 4 slanting upwardly toward the rear and a bottom face 6 curved to accommodate the various gear wheels within the housing. The forward end of the front section is made to accommodate the clutch mechanism and the rear part of the front section the change speed mechanism, with neither one of which we are concerned in the present application and which, therefore, are not shown. The change speed mechanism includes a counter shaft adapted to receive rotary motion from the drive shaft at different speed ratios, and this counter shaft, which is supported in a partitioned wall 7 in the housing is adapted to slidably receive and hold against rotation a short shaft 8, which latter forms a part of the present invention. This short shaft 8 is reduced in diameter at its front end to provide a shoulder 9 and has a beveled pinion 10 fastened on the reduced front end so as to bear against the shoulder. The extreme front end of the shaft 8, which is further reduced in size, accommodates two bearings 11 spaced by an internal flange 13 in the bearing partition 16 disposed in front of the partition wall 7, the remote bearing being held in place by means of the washer 14 and the nut 15 threaded upon the end of the shaft 8, while a cotter pin 17 holds the nut against turning.

The shaft 8 with its beveled pinion 10 and the bearings form the first unit of my assembly which unit will be hereinafter referred to as the driving unit. The second unit may be called the transmitting unit and is supported in two bearings 24 which latter are held in two cages 26 adapted to be introduced thru lateral apertures 27 in the housing after the second unit has been lowered into the latter. The cages are fastened upon the housing by means of screws 28. The third unit comprises the large differential gear 29 which is also lowered into the housing thru the opening in the top thereof and is secured in the customary manner.

The method of assembling the transmission includes the following principal steps:

First, the beveled gear 10 is pressed on the shaft 8 so as to make close contact with the shoulder 9. Next, press on the first of the two bearings 11 and introduce the entire unit into the housing thru the front opening, the housing being placed on end for this purpose until the first bearing 11 has entered the supporting partition 16 and reached the internal flange 13. The second bearing 11 is then introduced through the open top of the housing, pushed up against the internal flange 13 and fastened by means of the washer 14 and the nut 17.

The second unit, including the transverse shaft 21, the pinion 22, and the bevel gear 23, is next lowered into the housing thru the top opening until the shaft comes opposite the two side openings 27. The two bearing cages 26 are now introduced from the side so that the shaft 21 extends into the bearing 24 and the cages are secured in place by means of the screws 28, proper adjustment of the shaft and the beveled gear relative to the beveled pinion 10 being obtained by adjustment of the screws 28 and by introduction of shims for maintaining the adjustment.

The housing is then laid down with the right side up and the third unit rolled in thru the opening on top of the case.

It will be seen that this method of assembling my transmission is comparatively simple and with proper instructions could be carried out by any mechanic of ordinary skill.

I claim:

1. In a transmission assembly, an elongated housing divided into a front section having an open front end, and a rear section having an opened top, an apertured transverse partition between said sections; a driving unit adapted to be inserted into the aperture of the partition thru the open front end, means adapted to be inserted thru the open top for securing said driving unit in place; a transmitting unit being adapted to be placed in said rear section thru the open top thereof, so as to be in operative relation to the driving unit, means laterally slidable in the opposite walls of the rear section for securing said transmitting unit in place; and a differential unit secured in operative position relative to said transmitting unit in said rear compartment, and being rolled in place thru said open top.

2. In a transmission assembly, an elongated housing divided into a front section having an open front end, and a rear section having an opened top, an apertured transverse partition between said sections; an internal flange in the aperture of the partition, a driving shaft having a reduced end extending thru the aperture, a driving gear on the reduced end, a bearing disposed in said partition between said internal flange and said driving gear, means inserted thru the open top of the rear section, secured on the reduced end so as to bear upon said internal flange for maintaining the driving shaft in position; a transmitting unit being adapted to be placed in said rear section thru the open top thereof, so as to be in operative relation to the driving unit, means laterally slidable in the opposite walls of the rear section for securing said transmitting unit in place; and a differential unit secured in operative position relative to said transmitting unit in said rear compartment, and being rolled in place thru said open top.

3. In a transmission assembly, an elongated housing divided into a front section having an open front end and a rear section having an opened top, an apertured transverse partition between said sections; a driving unit adapted to be inserted into the aperture of the partition, means adapted to be inserted thru the open top for securing said driving unit in place; a transmitting unit being adapted to be placed in said rear section thru the open top, so as to be in operative relation to said driving unit; said rear section having apertures in the opposite side walls thereof, cages detachably secured in said side apertures for securing said transmitting unit in place, said cages being slidable into said side apertures from the outside of the housing; and a differential unit secured in operative position relative to said transmitting means in said rear compartment, and being adapted to be rolled in place thru said open top.

4. In a transmission assembly, an elongated housing divided into a front section having an open front end, and a rear section having an open top, an apertured transverse partition between said sections; an internal flange in the aperture of the partition, a driving shaft having a reduced end extending thru the aperture, a driving gear on the reduced end, a bearing disposed in said partition between said internal flange and said driving gear, means inserted thru the open top of the rear section, secured on the reduced end so as to bear upon said internal flange for maintaining the driving shaft in position; a transmitting unit being adapted to be placed into the rear section thru the open top, so as to be in operative relation to said driving gear, said rear section having apertures in the opposite side walls thereof, cages detachably secured in the side apertures for securing said transmitting unit in place, said cages being slidable into said side apertures from the outside of the housing; and a differential unit secured in operative position relative to said transmitting unit in said rear compartment.

In testimony whereof I affix my signature.

RUSH HAMILTON.